Figure 1:
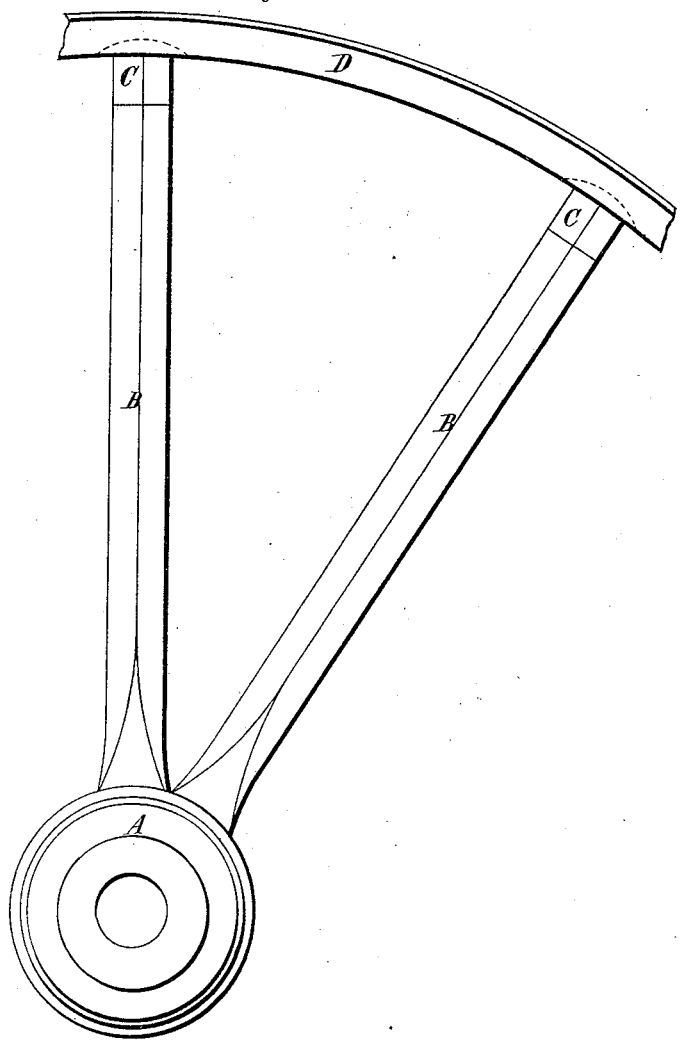

(No Model.)　　　　　　　　C. K. WELCH.　　　　2 Sheets—Sheet 1.
VEHICLE WHEEL.

No. 589,235.　　　　　　　　　　Patented Aug. 31, 1897.

Witnesses:
Raphaël Netter
Ernst Hopkinson

Charles K. Welch Inventor
by Duncan & Page Att'ys

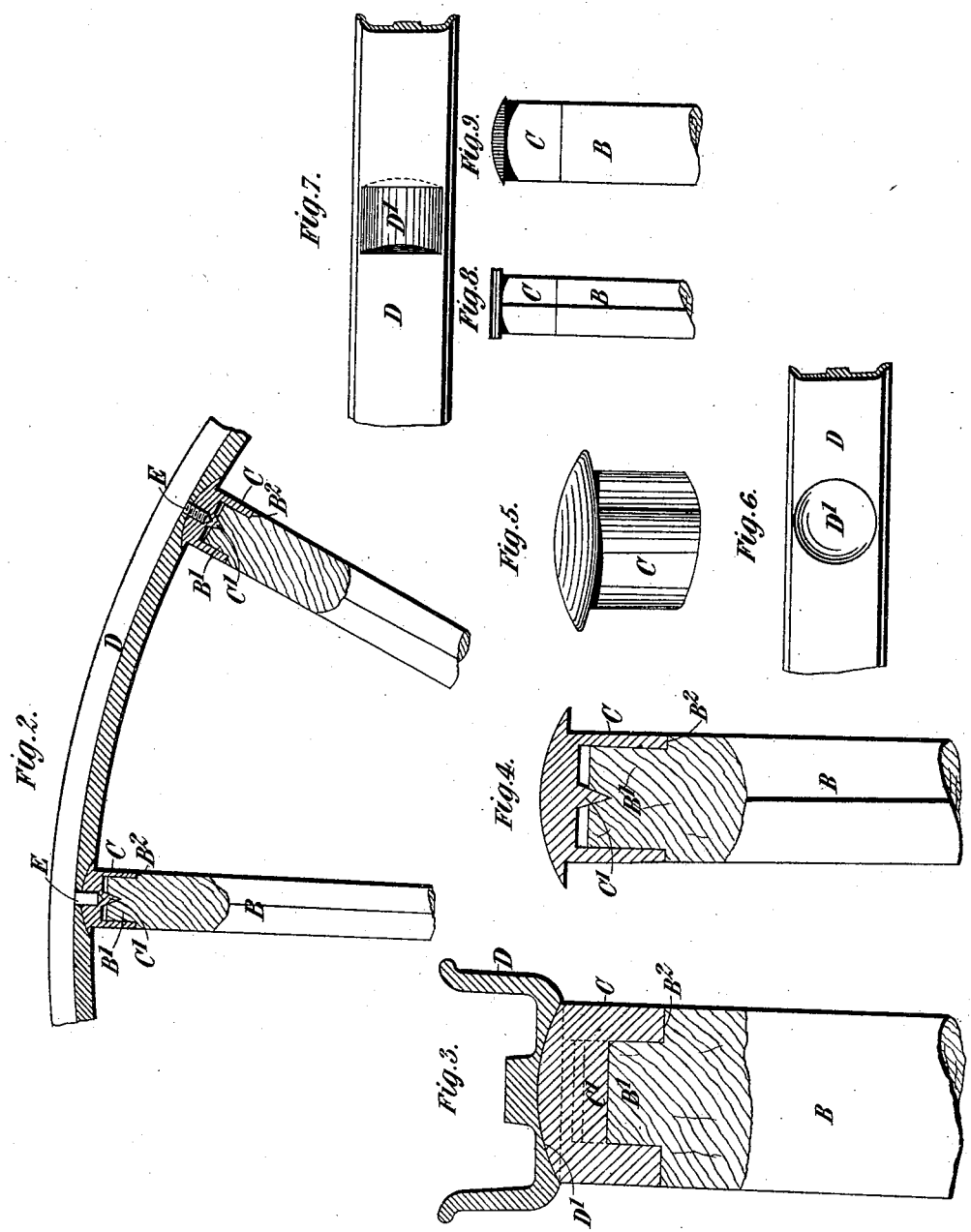

UNITED STATES PATENT OFFICE.

CHARLES KINGSTON WELCH, OF COVENTRY, ENGLAND, ASSIGNOR TO THE PNEUMATIC TYRE COMPANY, LIMITED, OF DUBLIN, IRELAND.

VEHICLE-WHEEL.

SPECIFICATION forming part of Letters Patent No. 589,235, dated August 31, 1897.

Application filed July 23, 1895. Serial No. 556,927. (No model.) Patented in England March 30, 1895, No. 6,617; in France June 26, 1895, No. 248,462, and in Belgium June 28, 1895, No. 116,310.

*To all whom it may concern:*

Be it known that I, CHARLES KINGSTON WELCH, engineer, a subject of the Queen of Great Britain, residing at Coventry, England, have invented certain new and useful Improvements Relating to the Securing of Metal Rims or Fellies to the Spokes of Vehicle-Wheels, of which the following is a specification, reference being had to the accompanying drawings.

I have obtained patents for this improvement in the following countries: Great Britain, No. 6,617, dated March 30, 1895; France, No. 248,462, dated June 26, 1895, and Belgium, No. 116,310, dated June 28, 1895.

This invention relates to wheels for cabs, carriages, omnibuses, and similar vehicles, (the spokes of which wheels, whether of wood or of metal, are in compression or subject to endwise pressure,) and particularly to wheels that are to be fitted with pneumatic tires, and has for its object an improved method of and means for securing the metal rims or fellies to the spokes.

It is known at the present time to fix the metal rim or felly to the spokes where the wood felly is dispensed with by means of metal sockets driven tightly on the reduced outer ends or tangs of the spokes and riveted to the rim, the said sockets being furnished with flanges or heads through which the rivets are passed.

According to the present invention the riveting of the sockets to the rim is dispensed with, the outer ends of the sockets being made convex and the inner circumference of the rim or felly being provided with a number of concave depressions in line with the spokes and adapted to receive and fit the said convex ends of the sockets. The sockets having been tightly driven onto the ends of the spokes, the rim is heated to enlarge its diameter and is then passed over the spokes and contracted thereon by cooling, the diameter of the rim being such that when cool it very securely grips the ends of the spokes and holds them tightly in place. The concave depressions in the rim in combination with the convex ends of the sockets insure a very perfect fit and good bearing-surface between the sockets and the rim whatever may be the angle of the spokes or amount of dish of the wheel, thereby relieving the tangs from any undue strain, such as is likely to occur when the sockets are riveted to the rim.

The said invention is illustrated in the accompanying drawings, wherein—

Figure 1 is a side view of a portion of a wheel. Fig. 2 is a central longitudinal section through the rim and through the ends of two spokes secured therein. Fig. 3 is a transverse section of the rim and of a socket and portion of the spoke applied thereto drawn to a larger scale. Fig. 4 is a section of the socket and spoke, taken in a direction at right angles to the section shown in Fig. 3. Fig. 5 is a perspective view of the socket. Fig. 6 is an under plan view of a portion of the rim, showing a concavity or recess therein for receiving the end of the spoke and drawn to the same scale as Figs. 1 and 2. Fig. 7 is a similar view showing a modified form of recess, hereinafter described. Figs. 8 and 9 are front and side views of a portion of a spoke and socket thereon adapted to fit the recess in the hub shown in Fig. 7.

Like letters of reference denote corresponding parts in the several figures.

A is the hub or box.

B B are the spokes.

C C are sockets fitted on the ends of the spokes.

D is the metal rim.

The sockets C are driven tightly onto the reduced ends or tangs B' of the spokes and may be held by friction or by any other suitable means. The sockets are sometimes provided with a wedge-shaped bar or knife C', extending diametrically across the hole therein, which knife enters the end of the tang when the latter is driven into the socket and presses the sides of the tang very tightly against the sides of the socket, thereby insuring a very tight hold. To still further reduce the chance of the socket working loose, the hole therein may be made slightly tapered, the larger diameter being at the bottom of the hole, as indicated in Fig. 4. This construction is, however, not essential to the carrying out of the invention, as the socket may be firmly secured on the tang by other means. The tang should be slightly shorter than the hole in the socket, so that its extremity will not touch the bottom of the hole, but the socket will bear firmly on the shoulder $B^2$ of the spoke.

The convex ends of the sockets may be spherical, as indicated in Fig. 5, or cylindrical, as indicated in Figs. 8 and 9. The sockets may be made of brass, or of malleable iron, or of steel cast or stamped.

In the inner circumference of the rim D are formed a number of cavities or recesses D', corresponding to the number of spokes and spaced at equal distances apart. These recesses are adapted to receive and fit the convex ends of the sockets. In the case where cylindrical recesses are provided to fit sockets having cylindrical ends the axis of the cylindrical surface is in the direction of the rim or is parallel to the plane of the rim, as indicated by Fig. 7.

In making the wheel the spokes are first secured in the hub or box by any of the usual methods, and the ends of the spokes are reduced, preferably, by a tanging-machine to form the tangs B'. The sockets are then driven or forced onto the tangs. The metal rim or felly having the concavities or recesses D', hereinbefore described, formed in its inner circumference is then heated to a suitable temperature to enlarge its diameter sufficiently to allow it to be passed over the ends of the sockets. The rim is then cooled by water or otherwise, and thus contracted onto the spokes, whereby the convex ends of the sockets are caused to enter and find a proper bearing or seating in the recesses in the rim. The length of the spokes is such that when the rim is contracted thereon, as above described, they will insure the amount of end pressure necessary to tighten up the wheel, and this result will be obtained without unduly straining the tangs. The end pressure so obtained may in most cases be made sufficient to prevent displacement of the spokes without any other fastening, but if additional security is required a pin, peg, dowel, or screw may be driven or passed through the rim into the end of the socket after the manner indicated at E in Fig. 2.

What I claim is—

1. The combination of a metal rim or felly formed with spherical concavities in the body of the metal of which it is composed and on the inner or hub side thereof, wooden spokes radiating from a hub, metal sockets or caps fitted over and inclosing the ends of said spokes, the said sockets or caps being formed with spherical heads which fit the concavities in the rim, the whole being held together by the shrinking or contraction of the metal rim on the spokes, as set forth.

2. The combination of a metal rim or felly exteriorly grooved to receive a pneumatic tire and having spherical concavities in the body of the metal composing the rim and on the inner or hub side thereof, wooden spokes radiating from a hub, metal sockets or caps fitted over the reduced ends of the spokes, and having closed spherical ends fitting the concavities of the rim, and wedge-shaped cross-bars in the bottom of the sockets to enter the ends of the spokes and wedge the same against the sides of the sockets, the whole being held together by the contraction of the rim, as set forth.

3. The combination of a metal rim or felly adapted to receive a pneumatic tire, spherical concavities or recesses in the inner circumference of the rim or felly, spokes radiating from a hub or box, metal sockets on the extreme ends of the spokes, said sockets having spherical ends adapted to fit into the concavities of the rim, the whole being held together by the contraction of the rim, substantially as described.

In testimony whereof I have hereunto set my hand this 5th day of July, 1895.

CHARLES KINGSTON WELCH.

Witnesses:
GEORGE HARRISON,
JOSEPH LAKE.